Aug. 8, 1944.   H. F. DE WEESE   2,355,517
AIRPLANE FLIGHT INDICATOR
Filed March 3, 1941   5 Sheets-Sheet 4

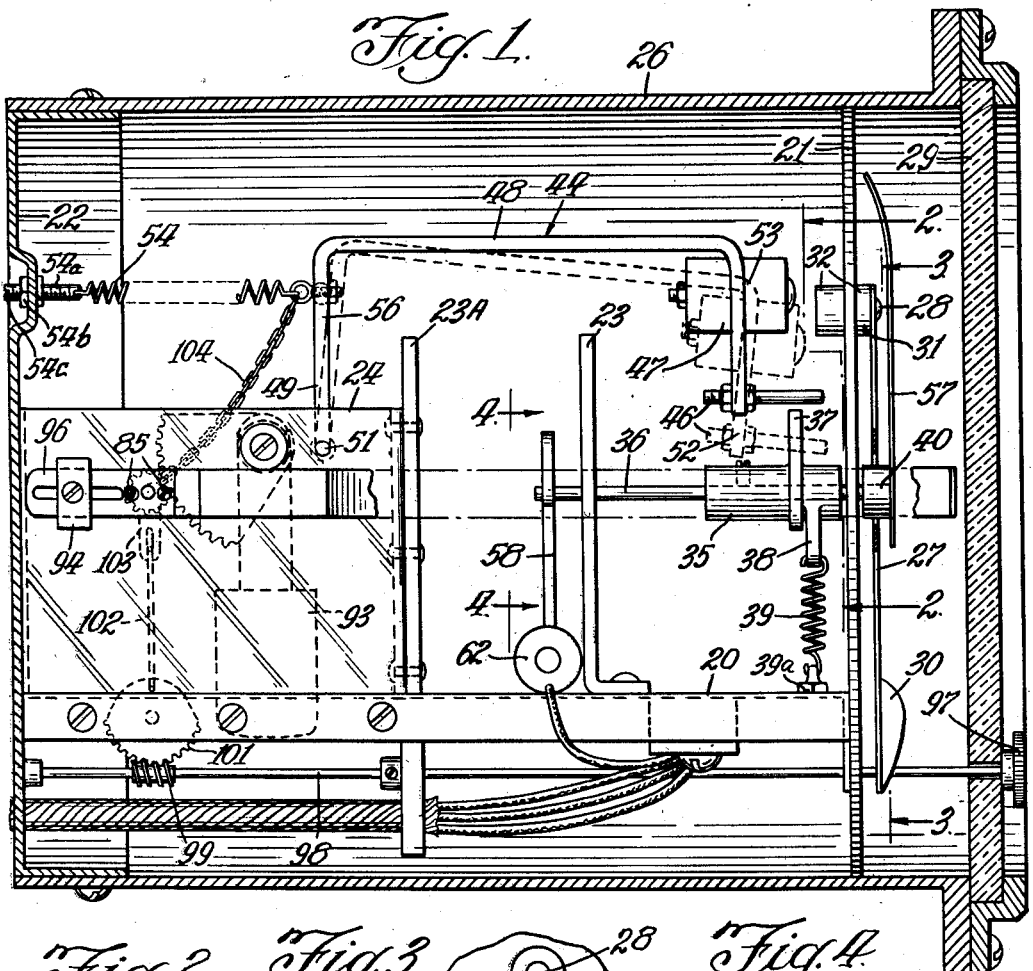
Aug. 8, 1944.   H. F. DE WEESE   2,355,517
AIRPLANE FLIGHT INDICATOR
Filed March 3, 1941   5 Sheets-Sheet 1
Inventor:
Herbert F. De Weese
By Freeman L. Mueller
Atty Aug. 8, 1944.   H. F. DE WEESE   2,355,517
AIRPLANE FLIGHT INDICATOR
Filed March 3, 1941   5 Sheets-Sheet 2
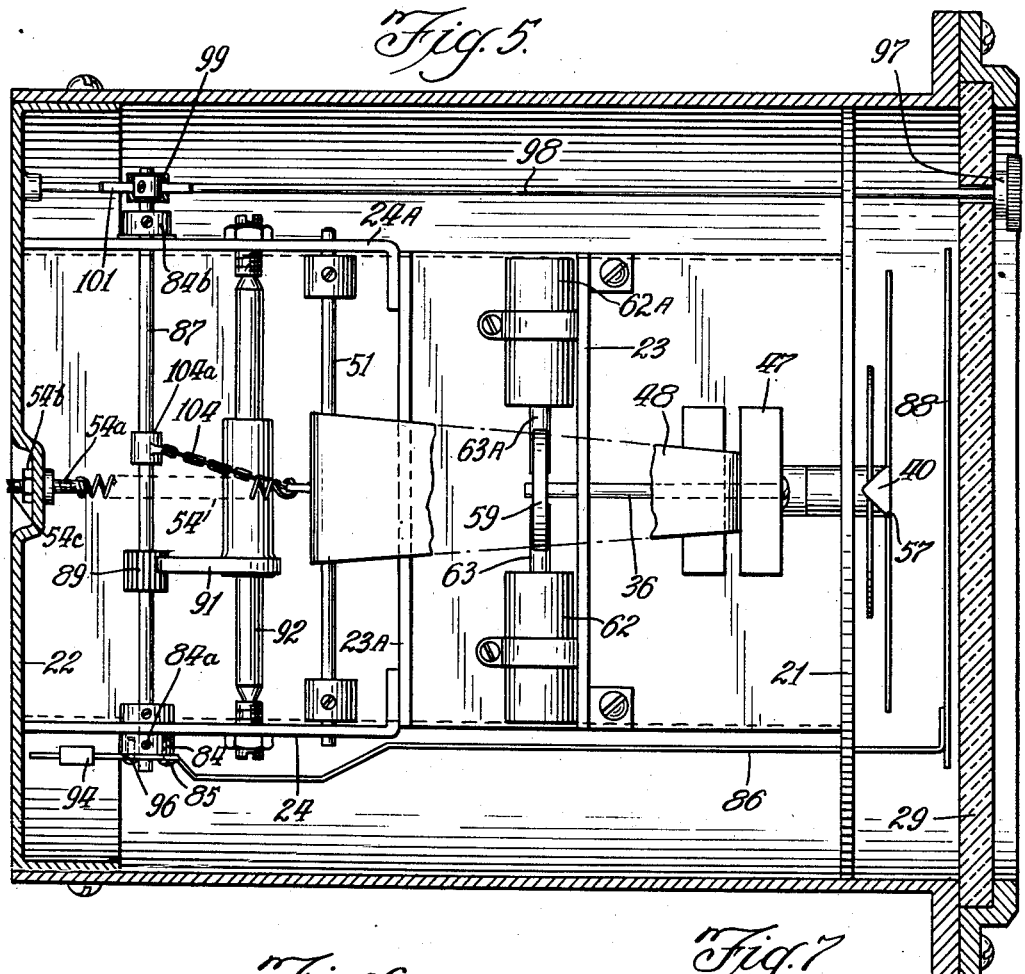
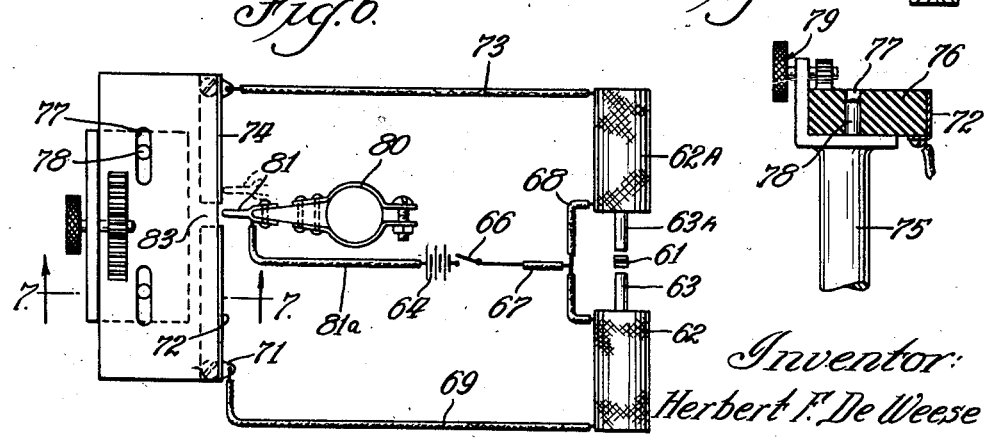
Inventor:
Herbert F. De Weese
By Foorman L. Mueller
Atty.

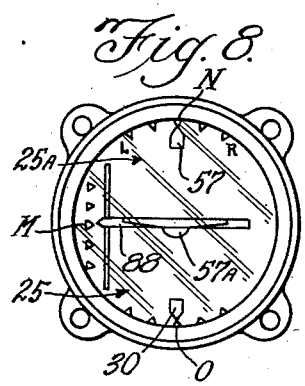
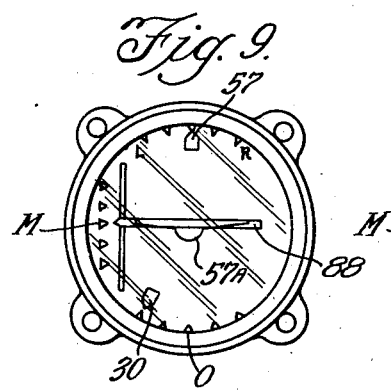
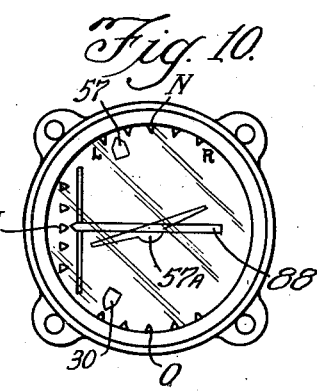
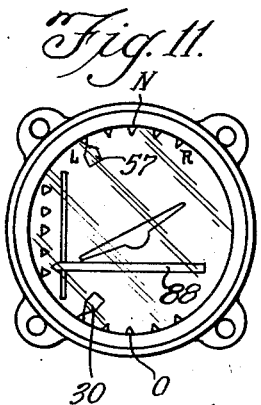
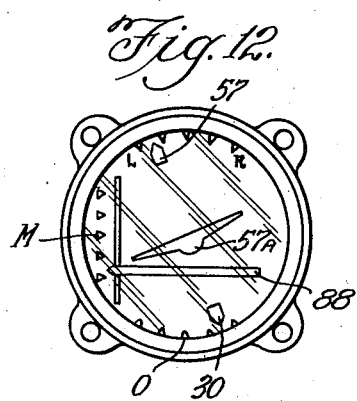
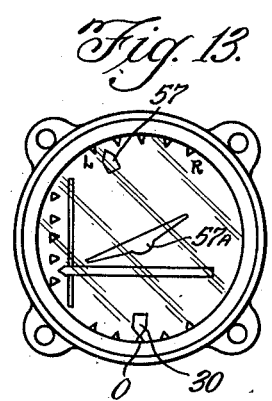
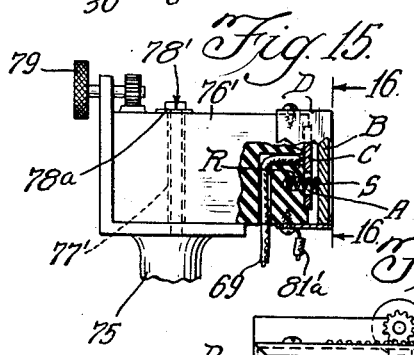
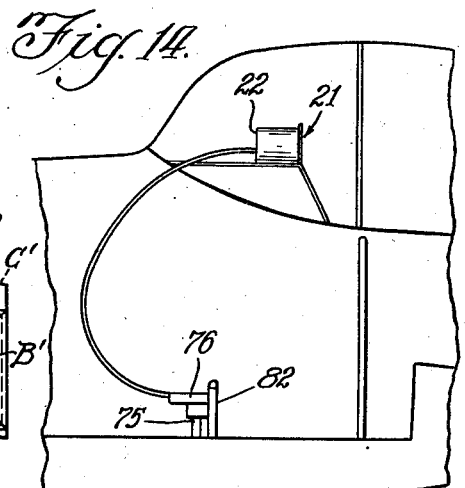
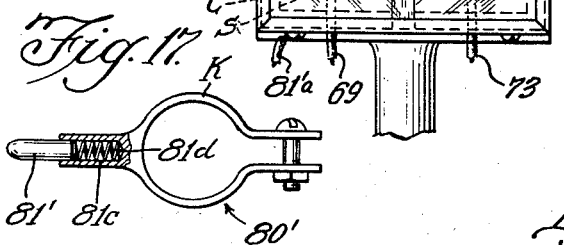

Inventor:
Herbert F. De Weese
By Forman L. Mueller
Atty.

Aug. 8, 1944.　　　H. F. DE WEESE　　　2,355,517
AIRPLANE FLIGHT INDICATOR
Filed March 3, 1941　　　5 Sheets-Sheet 5

Inventor:
Herbert F. DeWeese
By: Foorman L. Mueller
Atty.

Patented Aug. 8, 1944

2,355,517

UNITED STATES PATENT OFFICE 2,355,517

AIRPLANE FLIGHT INDICATOR

Herbert F. De Weese, Lincoln, Nebr.

Application March 3, 1941, Serial No. 381,471

20 Claims. (Cl. 33—204)

This invention relates to flight instruments for aircraft and in particular to a flight indicating device which gives all indications as to the attitude of an aircraft on a single dial face.

It is an object of this invention to provide an improved flight indicating device for aircraft.

A still further object of this invention is to provide an improved flight indicator which is rugged and compact in construction, inexpensive in cost, and which correctly and simply indicates the attitude of the airplane on a single reading face.

A feature of this invention is found in the provision of flight indicating mechanism for an airplane in which turn indicating means are controlled directly in response to a movement of the rudder pedal from a neutral position.

Another feature of this invention is found in the provision of turn and bank indicating means in a flight indicating instrument for an airplane in which a reference pointer is initially movable in response to means actuated directly by the rudder pedal of the airplane to properly indicate the turn of the airplane, and is continued in its movement by means operable in response to the inertia forces acting on the airplane to indicate the bank of the airplane while in the indicated turn.

Further objects, features and advantages of this invention will become apparent from the following description when taken in connection with the accompanying drawings in which:

Fig. 1 is a longitudinal sectional view of one form of the invention;

Fig. 2 is a sectional view taken along the line 2—2 in Fig. 1;

Fig. 3 is a view taken along the line 3—3 in Fig. 1 showing the skid and slip indicating means;

Fig. 4 is a fragmentary view taken along the line 4—4 in Fig. 1 showing an operating unit for the turn and bank indicating means;

Fig. 5 is a plan view of the device shown in Fig. 1;

Fig. 6 is a diagrammatic control circuit for the operating unit shown in Fig. 4;

Fig. 7 is a sectional view taken along the line 7—7 in Fig. 6;

Figs. 8–13 show the dial face of the improved device with the indicating pointers being illustrated in various flight indicating positions;

Fig. 14 is a fragmentary schematic illustration of an airplane showing the arrangement of the improved indicating device therein;

Fig. 15 is an end elevation partly in section of another form of the switch device shown in Fig. 7;

Fig. 16 is a view taken along the line 16—16 in Fig. 15;

Fig. 17 is a detail plan view of a rudder contact adapted for use with the switch device of Fig. 15;

Figure 18:
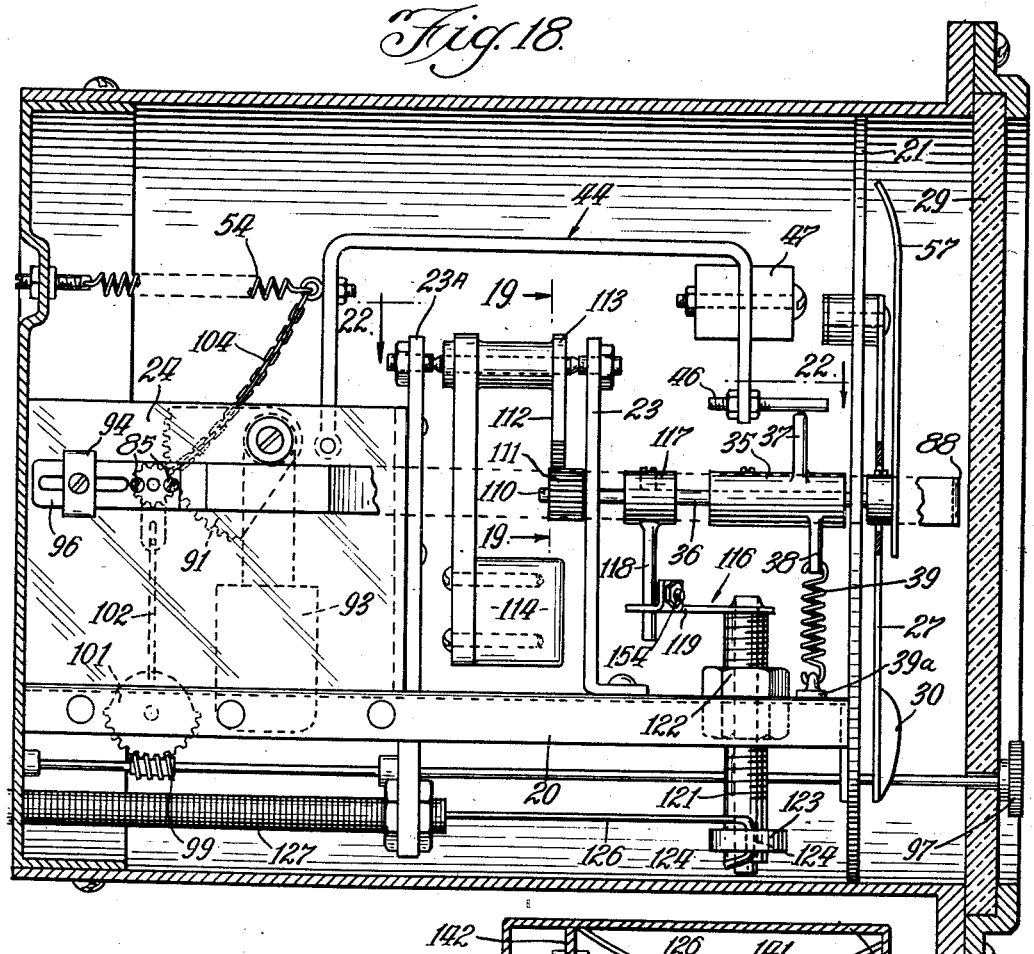
Fig. 18 is a longitudinal sectional view of another form of the invention.
Figure 20:
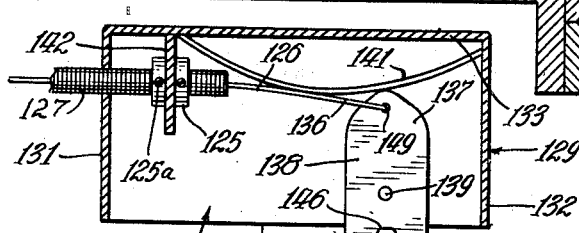
Fig. 20 is a plan view showing the mechanism for connecting the rudder pedal with the turn indicating means.
Figure 19:
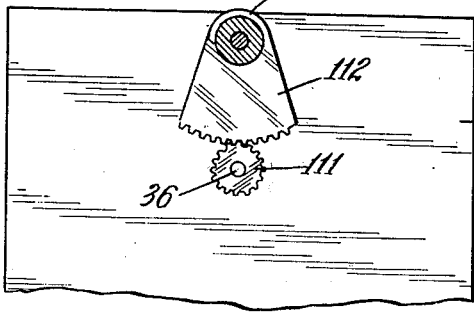
Fig. 19 is a view of a portion of the bank and turn indicating means as seen along the line 19—19 in Fig. 18.

The invention is illustrated as including in a single instrument means for indicating the slip and skid of an airplane, means for indicating the direction of turn and the magnitude of the bank of the airplane, and means for indicating the pitch or incline of the airplane. Each of the above means is provided with a reference pointer or indicator which are operatively associated with a common dial face positioned so as to be plainly visible to the operator of the airplane. The slip and skid means, the means for indicating the magnitude of bank and the inclinometer means are operated in response to the inertia forces acting on the airplane, while the means for indicating the turn of the airplane is in operative engagement with the rudder pedal of the airplane and actuated in response to a turning movement of the rudder from its neutral position. It is to be understood that the term "inertia forces" includes the force of gravity, as well as the accelerating, decelerating and centrifugal forces which act on the airplane.

With reference to the drawings, the invention is illustrated in Figs. 1 and 5 as having frame means comprised of a base plate 20, end plates 21 and 22, and intermediate supporting plates 23 and 23A, and 24 and 24A connected to the base plate. As is clearly shown in Fig. 5, plates 23 and 23A extend transversely of the instrument while plates 24 and 24A are arranged longitudinally thereof, it being contemplated that the instrument be assembled for use with the end plates 21 and 22 positioned transversely of the airplane. End plate 21 is provided on the outside thereof with suitable flight indicating indicia and serves as the indicating or dial face of the instrument which is completely enclosed by housing means 26 including a glass observation window 29 located in front of and spaced from the dial face 21. Mounted directly on the dial face 21 and vertically suspended between the face 21 and dial glass 29 for pivotal movement over the lower segmental portion 25 (Fig. 8) of the dial face is a pendulum unit 27 adapted to indicate the slip and skid of the airplane. Pendulum 27 has axis means 28 integrally connected to the upper end thereof rotatable in a bearing 31 supported on the face 21. Brass washers 32 at opposite ends of the bearing member 31 serve to dampen the pendulum unit against movement in response to hysteresis, or the vibrations and oscillations which normally occur in the airplane when it is in flight. The lower end 30 of the pendulum 27 is of point form so that such end cooperates directly with the lower segmental portion 25 in indicating the magnitude of slip and skid. Intermediate the ends of the pendulum unit is a transversely extending arcuate slot 34 (Fig. 3) adapted to receive therethrough a rotatable control member or shaft 36 to permit a pivotal movement of the pendulum unit to opposite sides of the shaft, but out of contact with the shaft. By virtue of this assembly the pendulum unit 27 is free-swinging over the segmental portion 25 of the dial face and responsive in operation to the inertia forces acting on the airplane to indicate directly the magnitude of slip and skid at all times while flying, as will be later explained.

The control member 36 is rotatably supported in end plate 21 and in the transverse supporting plate 23 in a position at right angles to the dial face or end plate 21 and comprises part of the means for indicating the direction of turn and magnitude of bank of the airplane. Suitably mounted on the shaft between the plates or frame members 21 and 23 is a sleeve member 35 having an integrally formed cam portion 37 and a connecting portion 38 which project radially from opposite sides thereof. The portion 38 projects downwardly from the shaft 36 and is connected at its outer end to one end of a tension spring 39, the opposite end of which is connected to a tension adjusting screw 39a threadably engageable with the frame base plate 20. In the operation of the instrument, as will be explained later, the spring 39 functions to restrain the shaft 36 against any movement in response to normal oscillations and vibrations occurring in the airplane during flight and further tends to retain the pointer 57 in a neutral position. Cam 37 projects upwardly from the control shaft 36 and is formed on opposite sides thereof with similar cam or working surfaces 41 and 42 (Fig. 2). A flat neutral surface 43 is located at the outer end of the cam 37 and between the sides 41 and 42. When the control shaft is in an idle or rest position the portions 37 and 38 are positioned in substantial vertical alignment, with the neutral surface 43 of the cam in a plane substantially parallel to the longitudinal plane of the control shaft 36. The end 40 of the control member 36, which projects from the dial plate 21, is provided with a reference pointer or indicator 57 positioned outwardly from the pendulum unit 27 and angularly movable over the upper segmental portion 25A of the dial face 21 (Figs. 1 and 8). It is contemplated that the pointer 57 indicate the left and right hand turns of the airplane and also the bank of the airplane while in such turn. The lever 57 includes an airplane configuration 57A, which is movable therewith.

Rotation of the control member 36 to indicate the degree at which the airplane is being banked, is accomplished by means of a pendulum or operating unit 44 having a cam follower portion 46 selectively engageable with the surfaces 41, 42 and 43 on the cam 37, the movement of the unit 44 being in response to the inertia forces acting on the airplane. The pendulum unit 44 comprises an arm 48 (Figs. 1 and 5) of substantially U-shape, the end 49 of which is provided with a pivot support or shaft 51 rotatably supported in the longitudinally extending frame plates 24 and 24A. Pivotal movement of the pendulum 44 is thus in a plane at right angles to the plane of movement of the pendulum 27. The cam follower 46 is connected to the opposite end 52 of the arm 48, an adjustable weight 47 being positioned near the end 52 on the leg member 53. As is readily apparent from Fig. 1, the arm 48 is of a length such that on pivotal movement thereof the cam follower 46 is moved into operative engagement with cam 37. When the pendulum 44 is in its rest position shown in full lines in Figs. 1 and 2, the cam follower or driving portion 46 is held in a position immediately above the neutral cam surface 43. This position of the cam follower 46 is retained by a tension spring 54 which is connected at one end to the leg member 56 of the pendulum arm 48 and at its opposite end to a tension adjusting screw 54a which is threadably supported in the end plate 22. The tension in spring 54 is adjusted so that it is sufficient to return the pendulum unit 44 to a rest position when the inertia forces acting on the weight 47 are of a predetermined minimum value. This adjustment is made from the outside of the instrument by turning the screw 54a with a screw driver, the adjustment being retained by a lock nut 54b. It is to be understood, however, that the screw 54a may be provided with a knurled adjusting knob instead of the screw driver slot 54c.

Moving the pointer 57 to indicate the direction of turn of the airplane is accomplished by a second operating unit 58 for rotating the control shaft 36. The unit 58 is arranged between the frame plates 23 and 23A, and includes a substantially spiral shaped spring 59 (Figs. 1, 4, and 5) connected at its inner end to the shaft 36 and having a contact or engaging portion 61 at its outer end. Spring 59 is of flat form and is positioned so as to move in a plane at right angles to the axis of the shaft 36. It is contemplated that the spring 59 be formed of a relatively stiff material so that movement of the spring end 61 serves to rotate the shaft 36 in either direction from its rest position. Actuation of the spring to rotate the shaft in either direction is accomplished by a pair of electro-magnets 62 and 62A having corresponding cores or poles 63 and 63A positioned on opposite sides of the armature 61. The magnet means 62 and 62A are selectively energized so that only one of the poles 63 and 63A attracts the armature 61 to a closed position therewith at any one time. This attraction of the armature 61 serves to rotate the shaft 36; the spring 59 acting as a flexible drive connection. It is contemplated that the spring 59 be composed of brass and the armature 61 of steel. This construction prevents the magnets 62 and 62A from effecting a permanent magnetization of the spring.

A control system for the electro-magnets 62 and 62A is diagrammatically illustrated in Fig. 6 and includes a battery 64 which may be the battery normally used in the airplane, a main switch 66, and common lead conductors 67 and 68 connected with the magnets 62 and 62A. The outlet conductor 69 for the electro-magnet 62 is connected to a terminal 71 provided on a conductor plate 72. Electro-magnet 62A is similarly connected through conductor 73 with a conductor plate 74. The plates 72 and 74 are of right angle shape and secured to an insulator 76 which is slidably supported on a stand 75. Insulator 76 is formed with slot-like apertures 77 for slidably receiving therein corresponding pins 78 provided on the stand member 75. An adjusting unit 79 is adapted to move the insulator 76, and hence the contact plates 72 and 74 on the stand 75, relative to a yieldable electrical contact 81 mounted on a bracket 80 for connection to the rudder control element or pedal 82 (Fig. 14) of an airplane. Contact 81 is connected with the battery 64 by conductor 81a. In the practice of this invention it is contemplated that the stand 75 be secured to the floor of the airplane and in a position adjacent the rudder pedal. Thus by suitable adjustment of the adjusting means 79, the conductor plates 72 and 74 are moved relative to the contact 81 so that the circuits for the electro-magnets 62 and 62A are deenergized when the pedal 82 is in a neutral position, this position corresponding to a position of the contact 81 opposite the portion 83 between the conductor plates 72 and 74. Movement of the rudder pedal 82, therefore, in a direction to one side of its neutral position, closes the circuit for one of the electro-magnets 62 and 62A with the attraction of the armature 61 to the pole of the energized magnet rotating the shaft 36 in a direction corresponding to the direction of movement of the rudder pedal. A neutral position of the armature 61 between the magnet poles 63 and 63a when the magnets are deenergized, is determined by the spring 59 previously described. The cooperative action of the operating units 44 and 58 in rotating the shaft 36 to indicate the direction of turn and magnitude of bank of the airplane will be explained later in the description of the operation of the invention.

A modified form of the control switch illustrated in Fig. 7 is shown in Figs. 15 and 16. The insulator base 76' is formed with apertures 77' adapted to receive pins 78' for slidably guiding the insulator base 76' in a supported position on the stand member 75. Pins 78' are formed with heads 78a slidably engageable with the top of the insulator base 76' and adapted to retain such base on the stand 75. Sliding of the base relative to the stand 75 is accomplished by the adjusting device 79. Each conductor 69 and 73 (Fig. 6) is electrically associated with a pair of contact plates B and C, and B' and C', respectively. Plate C is composed of copper and is supported directly on the insulator base 76' and connected with the conductor 69. Plate C' is similarly supported in the base 76' and connected with conductor 73. Plates B and B' are formed of brass and are slidably supported for movement laterally of the insulator base 76' by a bracket member D which is also formed of brass. Each pair of contact plates B and C, and B' and C' are separated from each other by an insulator portion 83'. However, the bracket member D is electrically common to both of the movable plates B and B', and is connected with the battery 64 by a conductor 81a'. Each corresponding pair of contact plates, are normally separated from each other by a spring element S located in a cavity or recess R formed in the insulator base 76' in register with an aperture or opening A provided in each stationary copper plate C and C'. Each opening A is sufficiently large so that the spring S extends therethrough without contacting the copper plate members, C and C'. Each spring S is thus retained in compression within a recess R by engagement with a corresponding brass plate B and B'.

In order to operate the control switch of Figs. 15 and 16 there is provided a contact device 80' (Fig. 17) for the rudder pedal 82 which is shown in Fig. 14. The contact device 80' includes a supporting bracket K and a spring-pressed plunger 81' adapted for slidable engagement with the plate members B and B' and the insulator portion 83' located between such two plates. The plunger 81' is slidably supported in a bore 81c formed in the bracket member K, a spring 81d being arranged in the bore so as to yieldably urge the plunger 81' against the plates B and B'. The pressure of the spring 81c is greater than the pressure of the springs S so that as the plunger 81' engages a plate B or B', such plate is slidably moved within the bracket D into contact with its corresponding stationary plate C or C', respectively. Since the plates B and B' are always connected to the battery 64 through the bracket D and conductor 81a' contact of, say plate B with plate C, closes the circuit for the electro-magnet 62 to magnetize the core 63 associated therewith. Similarly the magnet 62A is energized on contacting of the plates B' and C' by the contact device 80'. When the plunger 81' of the contact device 80' engages the insulator portion 83' it is apparent that neither of the magnets 62 and 62A is energized. This position of the contact device 80' designates the neutral position of the rudder for the airplane. By virtue of this construction, the rudder 82 is free of any connection with a conductor or supply line, and further, since the circuits for the magnets 62 and 62A are closed through a corresponding pair of contact plates, the occurrence of any spark resulting from this contact occurs between the contacting plate members and entirely within the control switch. There is thus eliminated any possibility of a free spark within the airplane cabin.

The inclination of the airplane, namely its pitch relative to an artificial horizontal line, is indicated by inclinometer means located between the frame plates 24 and 24A (Figs. 1 and 5). A reference indicator or arm 86 of substantially right-angle form is secured to a removable hub or collar portion 84 by screws 85. The hub 84 is frictionally held on a shaft 87 by a set screw 84a. Shaft 87 is rotatably supported in the plates 24 and 24A, the collar portion 84 and a similar collar portion 84b at the opposite end of the shaft fixing the position of the shaft 87 relative to the plates 24 and 24A. The indicating portion 88 of the reference arm 86 is arranged in a neutral position M longitudinally of the dial face 21 and through the center thereof so as to be vertically movable between the segmental portions 25 and 25A covered by the reference pointers 30 and 57, respectively (Fig. 8). A pinion gear 89 mounted on the shaft 87 is in operative engagement with a gear segment 91 mounted on the shaft 92 for a pendulum 93. The shaft 92 is rotatably supported in the plates 24 and 24A so that the movement of the pendulum 93 is in a plane at right angles to the dial face 21. Any change in the pitch of the airplane, therefore, produces a corresponding movement of the pendulum 93 and hence a turning of the gear segment 91 to in turn rotate the shaft 87. This rotation of the shaft moves the indicating portion 88 either upwardly or downwardly from its neutral position M corresponding to the direction of movement of the pendulum 93.

Positioning of the portion 88 in its neutral position is accomplished by means including a counterbalance 94 slidably supported on the arm end 96 as is clearly indicated in Figs. 1 and 5. Since the weight 94 and reference portion 88 are positioned on opposite sides of the pivotal support 87 for the arm 86, movement of the balance 94 on the end portion 96 moves the arm portion 88 vertically in an obvious manner. This adjustment by the counterbalance 94 may be facilitated by loosening the set screw 84a and angularly moving the arm relative to the shaft 87 to a desired position and then tightening the screw 84a. The final adjustment of the portion 88 to its neutral position is made by an adjusting knob 97 mounted on a shaft 98 rotatably supported in the end plates 21 and 22 and having a worm gear 99 thereon in meshing engagement with a corresponding gear segment 101, rotatably supported in the base plate 20. A spring member 102 is connected at one end to the gear segment 101 and at its opposite end to a connecting arm 103 mounted on the shaft 87. Shaft 98 extends through the observation glass 29 so that the knob 97 is manipulated from the outside of the instrument. Rotation of the knob 97 provides for a corresponding rotation of the shaft 87 to in turn move the reference portion 88. By virtue of the spring connection 102, the movement of the shaft 87 is dampened so as to eliminate any rotation thereof in response to the hysteresis effects occurring in the airplane during normal flight thereof. The reference pointer 88 is thus retained relatively steady and free of any fluttering movements. The adjusting knob 97 serves also to compensate the setting of the inclinometer means in accordance with a change in the cargo carried by the airplane.

Although the movement of the pendulum 93 has been explained as being in response to a change in the pitch of the airplane, it is to be understood that all of the inertia forces act on this pendulum. In some instances, therefore, the resultant effect of these forces in combination with a change in pitch of the airplane may be of such magnitude that the pendulum unit 93 is moved an amount sufficient to move the reference pointer 88 to a substantially locked position in one of its extreme limits of movement. It is apparent, of course, that with the reference pointer held in this extreme position a subsequent change in the pitch of the airplane will not be indicated thereby. To overcome this condition and to assure the change in pitch of the airplane being indicated at all times means are provided to restrain the movement of the reference pointer 88 to an extreme position. This restraining action is accomplished in the present invention by a chain 104 which is connected at one end to a crank arm 104a supported on the shaft 87 and at its opposite end to the leg member 56 of the pendulum unit 44. When the pendulum unit 44 is in its neutral position, the chain 104 is slack so that the pendulum 93 is free in its action to rotate the shaft 97. However, since the pendulum unit 44 is responsive in operation to the inertia forces acting on the airplane, an increase in these forces moves the unit 44 downwardly to its dotted line position shown in Fig. 1 to in turn tighten the chain 104. As was previously noted the pendulum unit 93 is also responsive to the action of the inertia forces, so that the increased effects of these forces acting on the unit 93 and tending to urge the reference portion 88 to an extreme position are counter-acted by the restraining force of the pendulum unit 44 acting on the shaft 87 through the chain 104. The motion of the pendulum 93 for the inclinometer is thus entirely free at all times prior to the tightening of the chain, but is restricted or retarded after such tightening by the action of the pendulum unit 44. It is apparent, of course, that this retarding of the movement of the pendulum 93 may affect to a slight degree the accuracy of the portion 88 near its extreme positions in indicating a change in pitch during flight, but improves the function of the pointer 88 in indicating at all times the direction of change of pitch.

In the operation of the flight indicating instrument let it be assumed that the plane is in straight flight, this condition being illustrated in Fig. 8 and that the control circuit and control switch of Fig. 6 is being used. It is to be understood of course that the operation is the same with the control switch in Figs. 15–17. The contact 81 on the rudder pedal 82 is in its neutral position between the conductor plates 72 and 74 and the pendulum unit 44 is in its rest position with the driving portion 49 above the neutral cam surface 43. Thus regardless of the inertia forces acting on the weight 47 there will be no movement of the pointer 57 since any pressure applied by the driving portion 47 downwardly on the neutral surface 43 is ineffective to rotate the shaft 36. Now let it be assumed that the airplane rudder (not shown) is properly manipulated to turn the airplane about its vertical axis. By virtue of this manipulation of the rudder a selected one of the magnets 62 and 62A is energized, whereby the contact 61 is attracted in a direction corresponding to the direction of movement of the rudder. Since the movement of the contact 61 rotates the shaft 36 in a predetermined direction the pointer 57 is moved a slight amount sufficient to indicate the character of the bank which the airplane makes in straight flight. However, since the pendulum unit 27 is freely movable at all times, it may be utilized during straight flight to indicate the extent of roll of the airplane about its longitudinal axis, which condition is shown in Fig. 9.

On changing the flight of the airplane from a straight course the rudder pedal 82 is moved to turn the airplane in a desired direction. Let it be assumed that the rudder is moved in a direction such that the contact 81 is moved into engagement with the plate 74 as shown in dotted lines in Fig. 6 to close the circuit for the electro-magnet 62A, the switch 66 having been previously closed either individually or concurrently with the ignition switch for the airplane engine. On energization of the electro-magnet 62A its corresponding core or pole face 63A is adapted to attract the armature 61 to move the same toward the left as viewed in Fig. 4. This movement of the contact 61 rotates the shaft 36 in a clockwise direction as viewed in Fig. 4 and in a counter-clockwise direction as viewed in Fig. 2, to in turn move the pointer 57 toward the left as is indicated in Fig. 10. It is to be understood that the pointer 57 is not immediately moved to an extreme position toward the left, but that the energization of the magnet 62A functions only to move the pointer 57 but a very small amount to one side of the neutral indication N. The function of the operating unit 58, therefore, in response to the movement of the rudder pedal 82 thus only indicates the direction of the turn and does not function to give any indication as to the magnitude of such turn. In other words the operating unit 58 initially rotates the control shaft 36 a small amount in a direction corresponding to the true direction of turn of the airplane.

This initial rotation of the shaft 36 moves the neutral surface 43 of the cam 37 out of an engaging position with the cam follower 46, and positions the working surface 42 for engagement with the follower. As the pendulum unit 44 moves downwardly to its dotted position (Fig. 1) in response to the inertia forces acting thereon, the follower 46 in turn moves downwardly on the surface 42 to continue the rotation of the shaft 36 in the direction of turn initially indicated by the pointer 57 and retained by the unit 58. Thus in making a turn the initial slight movement of the indicator 57 indicates the direction of turn, while its later movement at an increased distance away from the neutral point N indicates the magnitude of the bank while the airplane is in such turn. So long as the slip and skid indicator 27 is in its neutral position 0 the turn is being properly made. As indicated in Fig. 10 the turn is to the left with a bank of an amount indicated by the position of the pointer 57 and a slip indicated by the pointer 30. The use of the terms "slip" and "skid" are, of course, relative to the direction of turn. That is, movement of the airplane outwardly away from the direction of the turn is known as a "skid," while movement of the airplane in the direction of the turn is known as "slip." By virtue of the assembly of the pendulum unit 27 in the instrument, it functions to indicate directly and in the proper direction all slip and skid indications. Thus the position of the pointer 30 in Fig. 10 is to the left of its neutral position 0 and inwardly or toward the direction of turn of the airplane as indicated by the pointer 57, so that the pointer 30 indicates a slipping of the plane. Elimination of this slipping and the bringing of the airplane to a proper course for making the turn is accomplished by manipulation of the rudder pedal 82.

In the above description of the operation of the turn and bank indicating means, and of the slip and skid indicating means, it has been assumed that the flight of the airplane has been in a level course, namely, at a constant elevation. However, in Fig. 11 the attitude of the airplane is illustrated as skidding while turning to the left, concurrently with an increase in elevation. The indications of the inclinometer pointer 38 are read indirectly since its movement up or down corresponds indirectly with the up and down movement of the airplane. The skidding is eliminated by manipulation of the rudder, while the increase in elevation may be maintained as indicated in Fig. 13. In the event an increase in elevation is not desired, correction is made in the usual manner. The attitude of the airplane for a left turn with skidding and an increase in elevation is illustrated in Fig. 12.

The embodiment of the invention illustrated in Figs. 18–22 is similar in all respects to the embodiment of Fig. 1 except for the turn and bank indicating means. Similar numerals of reference, therefore, will designate parts similar to those in the embodiment of Fig. 1. Referring to Fig. 18 the end 110 of the shaft 36 arranged between the frame plates 23 and 23A has mounted thereon a pinion 111 which is in operative engagement with a gear segment 112 mounted on a shaft 113 for a pendulum unit 114. The shaft 113 is rotatably supported on frame plates 23 and 23A so that the pendulum unit 114 is pivotally movable in a plane parallel to the movement of the pendulum unit 27. Thus with the pendulum unit 44 in its neutral position and the airplane flying in a straight course any rolling of the airplane while in such course will be indicated by the reference pointer 57 by virtue of the pivotal movement of the unit 114 and its rotation of the shaft 36 through the gears 111 and 112. Because of the assembly position of the gears 111 and 112 this roll will be indicated in its true direction by the pointer 57. The pointer 57, therefore, operates to indicate the bank of the airplane whether the airplane is banking during a turn or rolling during a flight in a straight line. It is to be understood, of course, that the pendulum unit 27 will also operate at this time since it is free to swing at all times. Indications by the pointer 30, are thus used only to indicate slip and skid, while the pointer 57 is always operable to indicate at all times the amount of bank. In the event the pointer 30 is to be used to also indicate the roll of the airplane it is readily apparent that the pendulum 114 may be eliminated.

The assembly and operation of the unit 44 in rotating the control shaft 36 to indicate the magnitude of bank is similar in all respects to the embodiment of Fig. 1 so that further description thereof is believed to be unnecessary.

Figure 21:
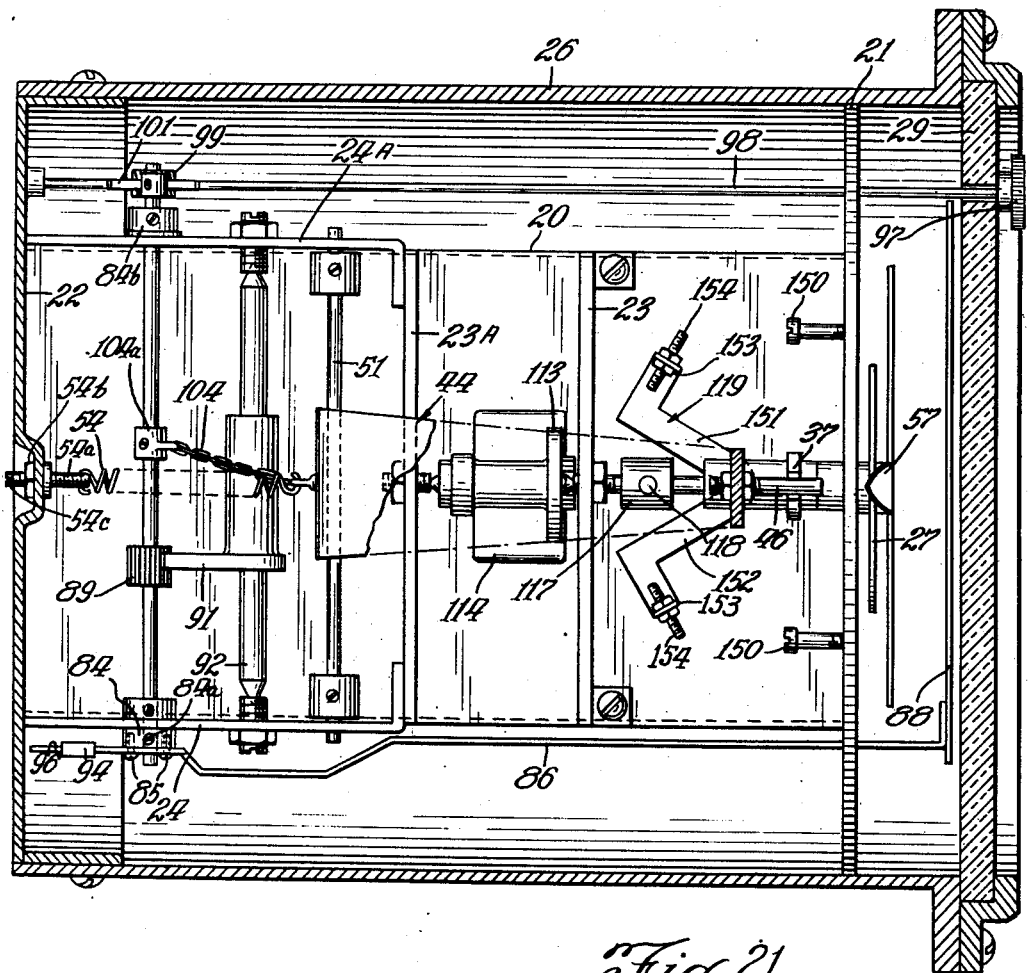
Fig. 21 is a plan view of the device illustrated in Fig. 18.
Figure 22:
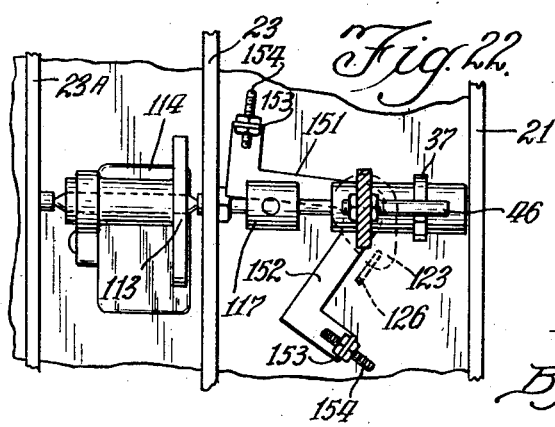
Fig. 22 is a fragmentary plan view taken along the line 22—22 in Fig. 18 showing the operating unit for the turn indicating means in a changed position.

Rotation of the shaft 36 to indicate the direction of turn of the airplane is accomplished by an operating unit 116 positioned between the frame plates 21 and 23 and including a sleeve member 117 mounted on the shaft 36. Sleeve 117 is formed with a downwardly projecting extension 118 for engagement with a pivotal V-shaped trip lever 119 (Figs. 21 and 22). The lever 119 is provided at the bottom of the V with a shaft or axis means 121 which is rotatably supported in a bearing 122 mounted in the frame plate 20 with the axis of the shaft 121 being arranged at substantially right angles to the axis of the shaft 36. The lower end of the shaft 121 has a lever 123 mounted thereon, the outer end of the lever having an aperture 124 formed therein adapted to receive one end of a Bowden wire or the like 126. The wire or connecting member 126 is suitably guided through a tubular element 127 to a switch mechanism 128 mounted on the floor of the airplane and adjacent the rudder pedal 82.

The switch unit 128 includes a housing 129 having end walls 131 and 132 and a side wall 133, the side 134 opposite the side wall 133 being open. In the assembly of the switch mechanism 128, it is contemplated that the open side 134 be positioned next to the rudder pedal 82. The end 136 of the connecting wire 126 is pivotally connected to the end 137 of a spring pressed lever 138 which is pivotally supported as at 139 to a bottom portion of the housing 129. The lever end 137 is of substantially circular contour and is arranged for sliding engagement with a flat spring 141 bowed between the end wall 132 and a stop portion 142 provided in the housing 129 and acting in part to guide the connecting wire 126 in its operating movements, as will be later explained. Collars 125 are mounted about the wire conduit 127 on each side of the portion 142. Each collar is provided with a friction screw 125a for locking the conduit in a fixed position within the housing 129.

End 143 of the spring actuated lever 138 is formed with a pair of corresponding cam surfaces 144 having a neutral or recessed portion 146 arranged therebetween. A cam follower or trip member 147 is connected to a bracket 148 adapted for mounting on the rudder pedal 82. When the rudder 82 is in its neutral position the member 147 is positioned opposite and partially within the recessed portion 146 and between the cam surfaces 144. It is to be noted that the portion 146, the pivotal support 139, and the connecting point 149 of the wire 126 to the lever end 137 are all in alignment substantially longitudinally of the lever 138, and in longitudinal alignment with the trip member 147 when such member is in its neutral position within the recess 146. By virtue of this arrangement and construction of the lever 138 and trip member 147 any slight pivotal movement of the lever 138 by the trip member 147 moves such two parts out of longitudinal alignment and positions the lever 138 for further pivotal movement by the spring 141. In other words, the pivotal movement of the lever 138 is initiated by the trip member 147 in response to the operation of the rubber pedal 82, with the spring 141 being arranged to continue the pivotal movement of the lever 138 in the direction determined by the action of the trip member 147. Thus, depending upon the direction of movement of the rudder pedal 82, the lever 138 is pivotally movable to either push or pull the connecting wire 126 to in turn pivotally move the lever 123 in opposite directions.

As is clearly apparent from Figs. 21 and 22 movement of the lever 123 in opposite directions moves either the leg member 151 or 152 of the trip lever 119 into engagement with the extension 118 on sleeve 117. Each leg member 151 and 152 is formed at the outer end thereof with an extension 153 having an adjusting screw 154 mounted thereon. The outer end of each adjusting screw 154 is engageable with a stop portion 150 provided on the end plate 21 to limit the pivotal movement of the lever 119 in response to the pivotal movement of the lever 138. This pivotal movement of the lever 119 is such that the extension 118 is moved an amount to rotate the shaft 36 an angular distance sufficient to move the neutral surface 43 of the cam 37 out of its engaging position with the following portion 46 of the pendulum or operating unit 44.

Thus let it be assumed that the airplane is flying in a straight course and that it is desired to make a turn toward the right. An actuation of the rudder pedal 82 the trip member 147 is moved in a direction to pivotally move the lever 138 in a counter-clockwise direction as viewed in Fig. 20. This movement of the lever 138, as continued by the action of the spring 141, pushes the connecting member 126 toward the left, also as viewed in Fig. 20, to in turn urge the lever 123 in a counter-clockwise direction as viewed in Fig. 22. This rotation of the lever 123 in turn rotates the lever 119 in a counter-clockwise direction, also as viewed in Fig. 22, so that the leg 151 is moved into engagement with the extension 118. Since the extension 118 is angularly moved a small distance determined by the adjusting screw 154, the shaft 36 is rotated but a small amount in a counter-clockwise direction as viewed in Fig. 19. This direction of rotation of the shaft 36 moves the indicator 57 toward the right, as viewed for example in Fig. 8, to indicate the turning of the airplane toward the right. The operating unit 116 thus performs a function similar to the function of the operating unit 58 in the embodiment of Fig. 1. A continued movement of the pointer 57 at an increased distance away from its neutral position N indicates the magnitude of bank, while the airplane is in the turn initially indicated by the pointer 57. This magnitude of bank is obtained in response to the action of the pendulum unit 44 on the shaft 36 in the manner previously explained. In this connection, it is to be noted that a rotation of the shaft by the unit 44 is accomplished only when the inertia forces acting on the weight 47 are sufficient to overcome not only the pressure of the spring 39 but also the restraining force imposed thereon by the pendulum unit 114. By virtue of the gear ratio between the gears 111 and 112, which gear ratio is about 4 to 1, the restraining action of the unit 114 is considerably reduced so as to affect but slightly the rotation of the shaft 36 in response to a downward movement of the pendulum unit 44. It is to be noted further that the lever 138 in the switch mechanism 128 is returned to its neutral position by the lever 147 in response to the return of the rudder pedal 82 to its neutral position as by suitable tension springs usually associated with such pedal.

The invention thus provides a flight indicating instrument which is very simple and compact in construction and efficient in operation to directly and correctly indicate on a single reading face all of the indications by which the attitude of the airplane may be determined. The instrument is inexpensive in cost and flexible in installation so as to be applicable to all types of airplanes regardless of their size or weight. Since it may be installed in conjunction with already existing control equipment, its use may be readily extended to ships already in service. Because of the initial low cost of the instrument and hence the low cost of replacement thereof, it is particularly applicable to training ships where an inexpensive but accurate indicating mechanism is required.

It is to be understood that although the present invention has been described and illustrated with respect to several preferred embodiments thereof that it is not to be so limited, since changes and arrangements in the parts thereof can be made which are within the full intended scope of the invention as defined by the appended claims.

I claim:

1. In flight indicating mechanism for aircraft having a rudder pedal movable to a neutral position, the combination of means for indicating the direction of turn and magnitude of bank of said aircraft including a movable control member, means for moving said control member including a first operating unit responsive to the movement of said rudder pedal from said neutral position to initially move said control member to indicate the direction of turn of said aircraft, and a second operating unit responsive to the inertia forces acting on said aircraft as a result of said turn and continuing the movement of said control member in the direction of said initial movement to indicate the magnitude of bank of said aircraft while in said indicated turn, said first and second operating units including interlocking elements for preventing said second operating unit from actuating said control member until said rudder pedal is moved from its neutral position.

2. In a flight indicating instrument for an aircraft, the combination of means for indicating the magnitude of bank of said aircraft including a pendulum unit movable in a vertical plane extending longitudinally of said aircraft and a reference member operatively connected with said pendulum unit and controlled thereby to indicate the magnitude of bank of said aircraft, means for indicating the pitch of said aircraft including a second pendulum unit movable in a plane parallel to said first pendulum unit and a second reference member operatively connected with said second pendulum unit and movable to two extreme indicating positions, said two pendulum units being responsive to the inertia forces acting on said aircraft as a result of movement of said aircraft, and means operatively connecting said first and second pendulum units so that the movement of said second pendulum unit is retarded by the movement of said first pendulum unit when said second reference member approaches one of its extreme indicating positions.

3. In mechanism for indicating the flight of an airplane having a rudder pedal movable to a neutral position, with said mechanism including an indicating face for visual observation of the airplane's attitude, the combination of means for indicating the direction of turn and magnitude of bank of said airplane including a pendulum unit responsive in operation to the inertia forces acting on said airplane as a result of said turn, said pendulum unit including a driving portion, a rotary control member having a cam portion, means supporting said control member for rotation, said driving portion being operatively engageable with said cam portion to rotate said control member, an indicator mounted near one end of said control member and movable over a segmental portion of said indicating face, means for initially rotating said control member to position said cam portion for selective engagement with said driving portion, and means operatively connecting said latter means with said rudder pedal, said rudder pedal on movement thereof from said neutral position providing for the actuation of said latter means to initially rotate said control member, with said initial rotation moving said indicator to indicate the direction of turn of said airplane prior to any movement of said indicator resulting from the engagement of said driving and cam portions to indicate the magnitude of bank.

4. In an instrument for visually indicating the attitude of an airplane having a rudder control element movable to a neutral position, the combination of means for indicating the direction of turn and magnitude of bank of said airplane including a rotatable control member having an engageable portion thereon, a pendulum unit responsive in operation to the inertia forces acting on said airplane as a result of said turn, said pendulum unit on movement thereof in response to said forces operatively engaging said engageable portion and rotating said member, with the degree of said rotation indicating the magnitude of bank of said airplane, and means for initially rotating said control member in response to a movement of said rudder control element from said neutral position including an operating unit having a portion supported on said control member, with said movement of the rudder control element acting on said operating unit and rotating said control member to indicate the direction of turn of said airplane prior to any rotation of said control member by said pendulum to indicate the magnitude of bank.

5. In an instrument for indicating the flight of an airplane having a rudder control element movable to a neutral position, the combination of means for indicating the magnitude of bank of said airplane when the airplane is in an indicated turn including a rotary control member, means rotatably supporting said control member in said instrument, said control member having a cam portion formed with oppositely positioned working surfaces, with a neutral surface arranged between said working surfaces, a pendulum unit movable in response to inertia forces acting on said airplane as a result of said turn and having a driving portion selectively engageable with the working surfaces on said cam portion, said driving portion being engageable with said neutral surface when said airplane is in straight flight, and means for initially turning said control member in a direction corresponding to the direction of movement of said rudder control element from said neutral position, said latter means being operatively connected with said rudder control element and control member, with said initial rotation of the control member indicating the direction of turn of said airplane and positioning one of said cam working surfaces for engagement with the driving portion of said pendulum unit, so that movement of said pendulum unit continues the rotation of said cam in the direction of said initial rotation to indicate the magnitude of bank of the airplane while said airplane is in said indicated turn.

6. In a flight indicating instrument for an airplane having a rudder control element movable to a neutral position, the combination of means indicating the direction of turn and magnitude of bank of said airplane including a pendulum unit, a rotary control member, means rotatably supporting said control member in said instrument, means pivotally supporting said pendulum unit for movement in a plane axially of said control member, said pendulum unit being movable in response to the inertia forces acting on said airplane as a result of said turn to rotate said control member, said control member having a cam portion with oppositely arranged working surfaces and a neutral surface intermediate said working surfaces, and said pendulum unit having a driving portion selectively engageable with said three surfaces, with said driving portion being engageable with said neutral surface when said airplane is in straight flight to render said pendulum unit inoperative to rotate said control member, means operatively connecting said control member with said rudder control element including an operating unit responsive in operation to a movement of said rudder control element from said neutral position to initially rotate said control member in a direction corresponding to the direction of movement of said rudder control element, said initial rotation moving one of the working surfaces on said cam portion into an engaging position with said driving portion so that movement of said pendulum unit by said inertia forces continues the rotation of said control member in the direction of said initial rotation to indicate the magnitude of bank.

7. In a control instrument for an airplane having a rudder control element movable to a neutral position, with said instrument being mounted on said airplane in a position in front of the operator and having a dial face with left and right-hand indicia arranged thereon corresponding to the turning of said airplane as viewed by the operator, the combination of means for indicating the direction of turn and the magnitude of the bank in such turn including a control unit having a reference pointer thereon, means rotatably supporting said control unit in said instrument so that said pointer is movable between the left and right-hand indications on said dial face, said pointer during straight flight of said airplane being in a neutral position, said control unit having a vertically extending cam portion thereon, with working surfaces on opposite sides thereof and a neutral surface arranged between said working surfaces, an operating unit having a driving portion selectively engageable with said three surfaces, said driving portion being engageable with said neutral surface when said pointer is in its neutral position, said operating unit being movable into operative engagement with said control unit in response to the inertia forces acting on said airplane as a result of said turn, and means operatively connecting said rudder control element and control unit including a second operating unit, with movement of said rudder control element from its neutral position to change the direction of flight of said airplane actuating said second operating unit to initially rotate said control unit and position one of said working surfaces for engagement with said driving portion, said initial rotation moving said pointer to immediately indicate the direction of the turn, with the continued rotation of said control unit by said first operating unit moving said pointer to indicate the magnitude of bank while the airplane is in said indicated turn.

8. A control instrument for indicating the attitude of an airplane having a dial face arranged in a vertical plane extending transversely of said airplane, means indicating the direction of turn and magnitude of bank of said airplane including a pendulum unit, means supporting said pendulum unit for pivotal movement in a plane at right angles to said dial face, a reference member in operative engagement with said pendulum unit, means supporting said reference member for pivotal movement over a segmental portion of said dial face, means indicating the incline of said airplane including a second pendulum unit, means supporting said second pendulum unit for pivotal movement in a plane substantially at right angles to said dial face, a second reference member in operative engagement with said second pendulum unit, means supporting said second reference member for movement vertically over said dial face, said two indicating means being responsive in operation to the inertia forces acting on said airplane, and means operatively connecting said two pendulum units so that the movement of said second pendulum unit is restrained by a counteracting movement of said first pendulum unit when said second reference member approaches one of its extreme indicating positions.

9. In a flight indicating instrument for an airplane having a rudder control element movable to a neutral position, the combination of means for indicating the direction of turn and magnitude of bank of said airplane including a rotary control member having a cam portion thereon, an operating unit for initially rotating said control member including a driving portion supported on said control member, magnet means positioned on each side of said driving portion, with said driving portion being selectively attractable by said magnet means, an energizing circuit for said magnet means including a movable switch contact normally open but movable in response to a movement of said rudder control element from said neutral position to close said circuit and energize one of said magnet means, with said one magnet means attracting said driving portion and rotating said control member in a direction determined by the direction of movement of said rudder control element from its neutral position, and a second operating unit for continuing the rotation of said control member responsive to the inertia forces acting on said airplane as a result of said turn, and including a driving portion movable into engagement with said cam portion, said initial rotation of said control member by said first operating unit indicating the direction of turn of said airplane and moving said cam portion so that the continued rotation of said control member by said second operating unit is in the same direction as said initial rotation, with said continued rotation indicating the magnitude of bank, said one magnet means remaining energized to retain the control member in its initially rotated position until said switch contact is moved to an open position by the return of said rudder control element to its neutral position.

10. In a flight indicating instrument for an airplane having a rudder control element movable to a neutral position, the combination of means for indicating the direction of turn of said airplane including a rotary control member having a radially extending portion thereon, a pivoted operating member, means pivotally supporting said operating member for pivotal movement into engagement with said radial portion to rotate said control member, said operating member being so constructed and arranged that pivotal movement thereof in reversed directions provides for a reversed rotation of said control member, driving means operatively connecting said operating member with said rudder control element for pivotally moving said operating member in either direction in response to a movement of said rudder control element from its neutral position, with the moving of said operating member rotating said control member in a direction determined by said movement of said rudder control element and indicating the direction of turn of said airplane, said driving means including a pivoted lever pivotally movable to a predetermined position in response to the said movement of the rudder control element, and means releasably locking said lever in said predetermined position to lock said driving means in an operated position, with said locking means retaining said operating member and radial portion in operating engagement to hold said control member in its turn indicating position, said pivoted lever being released by said locking means on return of said rudder control element to its neutral position.

11. In flight indicating mechanism for aircraft having a rudder control element movable to a neutral position, the combination of means for indicating the direction of turn and magnitude of bank of said aircraft including a movable control member, electrical means for initially moving said control member to indicate the direction of turn of said aircraft responsive in operation to the movement of the rudder control element from said neutral position, and means responsive to the inertia forces acting on said aircraft as a result of said turn and operatively connected with said control member to continue the movement of the same in the direction of said initial movement to indicate the magnitude of bank of the aircraft while in said indicated turn.

12. In a flight indicating instrument for an airplane having a rudder pedal movable to a neutral position, the combination of means for indicating the direction of turn and magnitude of bank of said airplane including a rotary control member, means operatively connecting said rudder pedal and said control member including an operating unit having a magnetically attractable portion mounted on said control member, a pair of magnets for selectively attracting said attractable portion, an energizing circuit for said magnets operatively associated with said rudder pedal so that movement of said pedal from said neutral position closes said circuit through one of the magnets, with said one magnet attracting said attractable portion to initially rotate said control member and indicate the direction of turn of said airplane, and a second operating unit responsive to the inertia forces acting on said aircraft as a result of said turn and adapted to continue the movement of said control member in said initial direction to indicate the magnitude of bank of said aircraft while in the indicated turn.

13. In flight indicating mechanism for aircraft having a rudder pedal movable to a neutral position, the combination of means for indicating the direction of turn and magnitude of bank of said aircraft including a rotatable control member having a magnetically attractable portion thereon, a cam portion on said control member having a pair of working surfaces, a pair of magnets operatively associated with said attractable portion, means responsive to movement of said rudder pedal from said neutral position in one direction for energizing one of said magnets, thereby to attract said attractable portion and thus initially rotate said control member in one direction indicative of the direction of turn, said last-named means being responsive to movement of said rudder pedal from said neutral position in the opposite direction to energize the other of said magnets, thereby to attract said attractable portion and thus initially rotate said control member in the opposite direction also indicative of the direction of turn, and means responsive in operation to the inertia forces acting on said aircraft as a result of said turn and operating on one of said cam working surfaces to continue the rotation of said control member in the initially established direction of rotation to indicate the magnitude of bank of the aircraft while in the indicated turn, with said latter means being engageable with said neutral cam surface when the rudder pedal is in a neutral position.

14. In flight indicating mechanism for aircraft having a rudder pedal movable to a neutral position, the combination of means for indicating the direction of turn and magnitude of bank of said aircraft including a rotatable control member, electrical means for initially rotating said control member to indicate the direction of turn of said aircraft including a pair of spaced selectively energized magnets, a magnetically attractable portion arranged between said magnets, means operatively connecting said magnetically attractable portion with said member, with said connecting means providing for an initial rotation of said control member on attraction of said attractable portion by one of said magnets, but permitting rotation of said control member while said attractable portion is retained in an attracted position, means for energizing one of said magnets in response to a movement of said rudder pedal from said neutral position, and means for continuing the rotation of said control member in said initial direction of rotation to indicate the magnitude of bank of said aircraft while in said indicated turn.

15. In a flight indicating instrument for an aircraft, the combination of means for indicating the magnitude of bank of said aircraft including a first pendulum unit and a reference member operatively connected with said first pendulum unit and controlled thereby to indicate the magnitude of bank of said aircraft, means for indicating the pitch of said aircraft including a second pendulum unit and a second reference member operatively connected with said second pendulum unit and movable thereby to two extreme indicating positions, and means operatively connecting said first and second pendulum units so that the movement of said second pendulum unit is retarded by the movement of said first pendulum unit when said second reference member approaches one of its extreme indicating positions.

16. In flight indicating mechanism for an aircraft having turn control means movable into and out of a neutral position to turn said aircraft, the combination of means for indicating the magnitude of bank of said aircraft when in an indicated turn, and means retaining said bank indicating means inoperative when said turn control means is in said neutral position, said latter means being responsive in operation to the movement of the turn control means from said neutral position to permit the operation of said bank indicating means.

17. In a flight indicating mechanism for an airplane, turn and bank indicating means including a movable control member initially movable to indicate the direction of turn of said aircraft, an operating unit responsive in movement to the inertia forces acting on said aircraft, means operatively connected with said operating unit and movable with said control member, said movable means when said aircraft is in straight flight retaining said operating unit against movement, with initial movement of said control member to indicate the direction of turn of said aircraft moving said movable means to a position for being acted upon by said operating unit to continue the movement of said control member for indicating the magnitude of bank of said aircraft in said indicated turn.

18. A control instrument for an airplane including a rudder control element movable to a neutral position, means indicating the direction of turn and magnitude of bank of said aircraft including a rotary control unit, an operating unit operatively connected with said control unit and rudder, said rudder control element on movement thereof from said neutral position actuating said operating unit to initially rotate said control unit in a direction corresponding to the direction of the turn of said airplane, a second operating unit operatively connected with said control unit and responsive in operation to the inertia forces acting on said aircraft as a result of said turn to continue the rotation of said control unit in said initial direction to indicate the magnitude of bank, means for indicating the pitch of said airplane including a third operating unit responsive to said inertia forces, a reference member operatively connected with said third operating unit and movable thereby to two extreme indicating positions, and means operatively connecting said second and third operating units so that the movement of said third operating unit is retarded by the movement of said second operating unit when said reference member approaches one of its extreme indicating positions.

19. In a flight indicating mechanism for an aircraft having turn control means, turn and bank indicating means, means operatively connected with said turn control means for causing said indicating means to indicate a turn of said aircraft, means for causing said indicating means to indicate the magnitude of bank of said aircraft in an indicating turn, and means for preventing said last-named means from effecting operation of said indicating means until said first-named means has effected operation of said indicating means.

20. In a flight indicating mechanism for an aircraft having a rudder, means for indicating the magnitude of bank of said aircraft when said aircraft is in a turn, and means controlled by and in accordance with the setting of said rudder for maintaining said indicating means inoperative to indicate the bank of said aircraft so long as said aircraft is in straight flight.

HERBERT F. DE WEESE.